(12) United States Patent
Khan

(10) Patent No.: US 7,032,948 B2
(45) Date of Patent: Apr. 25, 2006

(54) SPORT BIKE MOTORCYCLE FAIRING ACCESSORY

(76) Inventor: Mohammed John Fitzgerald Khan, 14813 Mistletoe Ct., Silver Spring, MD (US) 20905

(*) Notice: Subject to any disclaimer, the term of this patent is extended or adjusted under 35 U.S.C. 154(b) by 38 days.

(21) Appl. No.: 10/795,327

(22) Filed: Mar. 9, 2004

(65) Prior Publication Data

US 2005/0200153 A1    Sep. 15, 2005

(51) Int. Cl.
*B62J 17/02* (2006.01)
(52) U.S. Cl. .............................. 296/78.1; 296/136.07
(58) Field of Classification Search ............. 296/78.1, 296/180.1, 91, 95.1, 96.11, 84.1, 136.07; D12/107, 126, 182
See application file for complete search history.

(56) References Cited

U.S. PATENT DOCUMENTS

| | | | | |
|---|---|---|---|---|
| 2,903,297 | A * | 9/1959 | Zbikowski | 296/78.1 |
| 4,130,315 | A * | 12/1978 | Shields | 296/78.1 |
| 4,135,758 | A * | 1/1979 | Clements | 296/78.1 |
| 4,830,423 | A * | 5/1989 | Nebu et al. | 296/78.1 |
| 5,458,390 | A | 10/1995 | Gilbert | |
| 5,487,585 | A * | 1/1996 | Wheatley | 296/100.18 |
| 5,788,313 | A * | 8/1998 | Willey | 296/78.1 |
| 5,855,404 | A | 1/1999 | Saunders | |
| 5,857,727 | A * | 1/1999 | Vetter | 296/78.1 |
| 5,979,966 | A * | 11/1999 | Suzuki | 296/78.1 |
| 6,017,076 | A | 1/2000 | Belisle | |
| 6,254,166 | B1 * | 7/2001 | Willey | 296/78.1 |
| 6,276,482 | B1 * | 8/2001 | Moriya et al. | 180/229 |
| 6,543,831 | B1 * | 4/2003 | Takemura et al. | 296/78.1 |
| 6,543,836 | B1 * | 4/2003 | Wheatley | 296/100.18 |
| 6,820,756 | B1 * | 11/2004 | Garza | 211/87.01 |
| 6,923,489 | B1 * | 8/2005 | Keys | 296/77.1 |

* cited by examiner

*Primary Examiner*—Patricia L. Engle
*Assistant Examiner*—Greg Blankenship

(57) ABSTRACT

A wind-shielding device for motorcycles, particularly for modern sport-style motorcycles commonly termed, "sportbikes". The device affords operators of sportbikes a means to enjoy motorcycling during winter months or any other time when the outdoor temperature is below that generally considered ideal for motorcycling, as typical of early spring and late fall, without enduring direct exposure to frigid on-coming air. The device conforms to and fits over a sportbike's factory-installed (original equipment) fairing and vastly improves wind protection. The present invention can be fabricated of an inexpensive and sufficiently rigid acrylic, polycarbonate, fiberglass, or other suitable material using common molding techniques. The device also protects the motorcycle's original equipment fairing and painted surfaces from potentially damaging stones and other airborne road debris.

17 Claims, 5 Drawing Sheets

SPORT BIKE MOTORCYCLE FAIRING ACCESSORY

BACKGROUND OF THE INVENTION

This invention pertains to the area of windshields (windscreens) and fairings for motorcycles, particularly for modem sport-style motorcycles commonly termed, "sportbikes". The present invention is a supplementary fairing for a sportbike. The Present invention conforms to and fits over a sportbike's basic design fairing ("base fairing") i.e., the fairing that is specifically designed for and installed on a given sportbike and is typically installed by the motorcycle manufacturer as an original equipment (OE) item, and vastly improves wind protection. The primary intent of this device is to afford operators of such motorcycles a means to enjoy motorcycling during early spring, late fall, and winter without enduring direct exposure to frigid on-coming air. The present invention can be fabricated of a readily-available and inexpensive acrylic, polycarbonate, fiberglass, or other suitable material. The present invention can be easily installed, thereby allowing the motorcyclist, regardless of his or her level of hands-on mechanical ability and experience, to set up his or her motorcycle for cold weather riding. Likewise, the present invention can be easily removed when outdoor temperatures become pleasant or removed whenever the rider so desires. The present invention also protects the motorcycle's base fairing and painted surfaces from potentially damaging stones or other airborne road debris.

As those who are familiar with modem motorcycles know, the base fairing of a sportbike is rigidly mounted to the forward, upper portion of the motorcycle's frame, not coupled to the motorcycle's handlebars, and includes a nominal windscreen typically of a clear polycarbonate material. Those who are familiar with modem motorcycles also know the base fairing of a sportbike significantly contrasts the front-end components of "standard" motorcycles, "cruiser" motorcycles, and "touring" motorcycles; standard and cruiser motorcycles use handlebar-mounted fairings, and touring motorcycles include substantial windscreens and fairings having width and height dimensions typically exceeding two-times those of sportbike base fairings.

The base fairing of a sportbike significantly contrasts the fairings used on other kinds of motorcycles because sportbikes are purpose-specific, high-performance vehicles. These motorcycles are designed for high speeds and accelerations and are commonly used in professional and amateur closed-course competitions. Like all other essential components of a sportbike, the base fairing plays an important role in the sportbike's performance capabilities. Sportbike fairings are specially engineered to minimize the motorcycle's drag to facilitate the highest possible speeds. The fairing's efficient aerodynamic shape and size however, inherently offer minimal wind protection for the sportbike rider; this is why in early spring, late fall and winter, when outdoor temperatures can be below that generally considered ideal for motorcycling, operating a sportbike can be uncomfortable or intolerable for most riders.

Some sportbike riders address the cold-weather issue, however, with only limited effectiveness, by installing a "tall" windscreen. The windscreen, which is the upper middle portion of the motorcycle's base fairing assembly, is easily removed and replaced since it is commonly fastened with simple screws. Domestically sold sportbikes are equipped with nominal windscreens that are typically made of a clear, colorless plastic by original equipment manufacturers (OEM).

In recent years, an explosive global growth in the popularity of sportbikes has occurred. Correspondingly so, the availability of "aftermarket" performance components and accessories for sportbikes has rocketed. While manufacturers of aftermarket products now offer replacement windscreens, which are available in a myriad of colors and match the size and shape of OEM-supplied windscreens, for nearly all sportbike models, the manufacturers of aftermarket products only offer "tall" replacement windscreens for a relatively small number of sportbike models. More important, the "tall" replacement windscreens currently available offer marginally improved wind protection over OEM-supplied windscreens. The present invention however, immensely improves wind protection over windscreens and sportbike base fairings because it is both taller than OEM-supplied and OEM replacement windscreens and wider than the entire base fairing assembly. The present invention shields more of the rider's upper body and provides wind protection to his hands; no current base sportbike fairing or aftermarket windscreen for a sportbike shields the rider's hands. The use of the present invention therefore, can effectively extend the riding season for sportbike owners in geographical areas where winter and winter-like temperatures normally preclude pleasurable motorcycling.

Prior art are limited in effectiveness and applicability. The present invention however, overcomes the shortcomings of prior art, solves art-related problems, and offers uniqueness in technological design and functionality. Known prior art include all listed herein:

| | | |
|---|---|---|
| 5,458,390 | Gilbert | October 1995 |
| 5,855,404 | Saunders | January 1999 |
| 6,017,076 | Belisle | January 2000 |

The proceeding discussions of the above cited patents clearly illustrate how the present invention discloses new and preferred embodiments.

U.S. Pat. No. 5,458,390, issued to Gilbert, describes an "enclosure assembly" that uses rigid support members attached to a touring-type motorcycle to form a cage-like frame around the entire motorcycle. Gilbert's device further utilizes a fabric cover connecting the rigid support members; the fabric cover and rigid support members together create an enclosure that shields the motorcycle operator (and passenger) from wind and rain. While Gilbert's device appears to offer an effective means for protection from harsh weather conditions for "touring bikes," it is unsuitable for sportbikes. Such a device installed on a sportbike would prevent the sportbike operator from effectively negotiating turns. At moderate to high speeds, the sportbike operator must be free to extend his leg and knee outward in the direction of a turn to successfully negotiate the turn; Gilbert's device unquestionably precludes extending of the leg and knee and greatly reduces a sportbike operator's ability to shift his body weight from one side of the motorcycle to the other. Additionally, Gilbert's device is not suitable for sportbikes since it would significantly diminish a sportbike's available ground cornering clearance (lean angle). The present invention, however, does not adversely affect the ability of the sportbike rider to maneuver his body to negotiate turns or impact a sportbike's lean angle.

U.S. Pat. No. 5,855,404, issued to Saunders, teaches a device that effectively extends the height of a motorcycle windscreen. As shown in FIGS. 2 and 3 of Saunder's patent specification, the device attaches to the upper portion of the motorcycle's windscreen via a complex combination of mechanical connectors and support arms. The connectors and support arms are said to be "removably connected" to the motorcycle using "hook and loop" type "fastener patches". These kinds of fasteners have been used in the clothing industry for decades. They are usually sewn onto fabrics and take the place of buttons, laces, or zippers, to provide a means for securing and closing garments, shoes, bags, etc. The use of "hook and loop" fasteners for mounting mechanical devices, including Saunder's device, onto motorcycles poses the following potential drawbacks: 1.) The adhesive used to secure the fasteners must adequately perform in the presence of substantial vibration and all weather conditions (One would not attempt to sew "fastener patches" onto a motorcycle or a motorcycle windscreen thus, it is presumed Saunder's device requires the use of an adhesive to attach the "fastener patches."), and 2.) The device would be easy for thieves to remove. Saunder's mounting system for his device poses yet another potential problem; the support arms, which mount on the motorcycle body as shown in FIGS. 1 and 2 of Saunder's patent specification, preclude the use of popular "tank bags" that provide a convenient means for carrying cargo on top of the motorcycle's gas tank. The present invention, however, uses a simple and effective means for mounting to a motorcycle without taking up the surface space available on the gas tank. Additionally, the present invention offers improved wind protection over Saunder's invention since Saunder's invention does not effectively extend the width of a motorcycle fairing assembly and does not provide wind protection for the motorcycle operator's hands.

U.S. Pat. No. 6,017,076 issued to Belisle, describes a bubble-like enclosure for a motorcycle. Belisle's device is unsuitable for sportbikes for all of the reasons cited in the preceding discussion regarding U.S. Pat. No. 5,458,390.

SUMMARY OF THE INVENTION

The present invention is a novel and unique means for providing substantial wind protection for the operator of a sportbike. The present invention mainly conforms to the shape and size of a given sportbike's base fairing for the purposes of fitting closely over a base fairing of a sportbike. The present invention features a central portion that departs (upward) in curvature from that of a sportbike's base fairing and windscreen to facilitate substantial wind protection for the sportbike operator's upper body. The present invention also deviates in gradient from the sides of the sportbike base fairing, extending outward on both left and right sides, to provide wind protection for the operator's hands.

It is also object of the present invention to allow for reliable and straightforward installation of an effective means for substantial wind protection for an operator of a sportbike. In a particular configuration of the present invention, the present invention utilizes the mounting points of a sportbike's rearview mirrors for fastening and shares the bolts (or other fasteners) used to attach the mirrors. The present invention also incorporates holes or voids that are located or spatially arranged in a pattern that corresponds to or suitably aligns with the locations of the factory-installed fasteners for the base fairing to allow either the use of the factory-installed fasteners or the use of other fasteners, in place of the factory-installed fasteners for the base fairing, for mounting the present invention. The present invention further incorporates a means, such as a flange, to adjoin a simple bracket, combination of brackets, and/or a bracket installed as original equipment rigidly connecting the frame of a sportbike, for mounting.

It is further the object of the present invention to provide an effective means for substantial wind protection for an operator of a sportbike which can be simply and economically manufactured. The present invention can be fabricated of inexpensive plastics, fiberglass or other like material that is suitable for common molding processes.

Yet another object of the present invention to provide an effective means for substantial wind protection for an operator of a sportbike which does not detract from the sporty good-looks of a sportbike. As described above, the geometry of the present invention follows the contour of a sportbike's base fairing, resulting in an aesthetically pleasing and "finished" OEM appearance instead of the ruining look of a jerry-built, after thought component. The present invention can be made transparent, using a material such as acrylic or polycarbonate, or painted, presumably matching a sportbike's factory paint color and scheme.

DETAILED DESCRIPTION OF THE INVENTION

Figure 1:
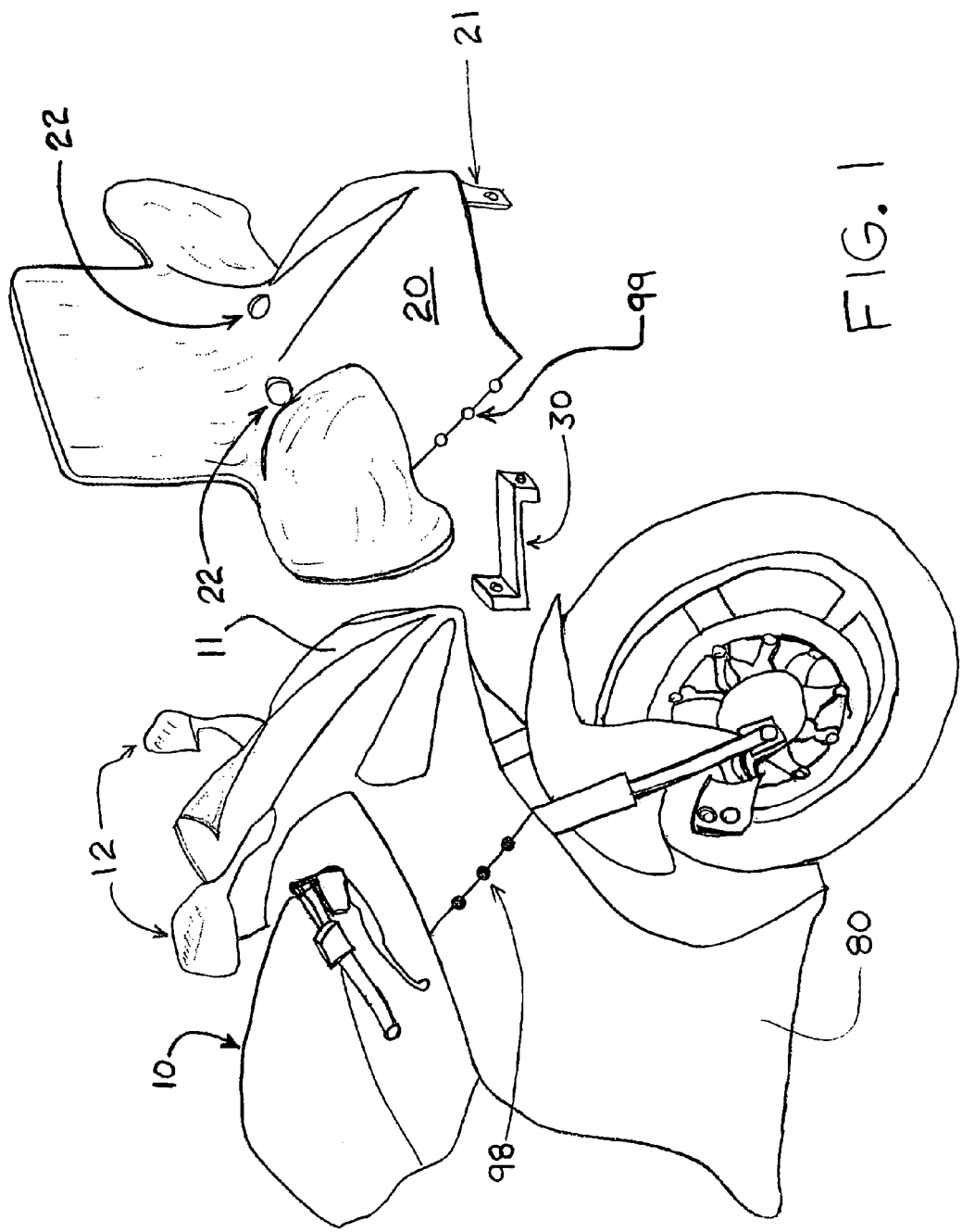
FIG. 1 is an oblique view of a front half of a modern sportbike and the present invention showing how the present invention, configured specifically for the particular sportbike model shown, fits over the entire motorcycle's base fairing assembly.

Referring to FIG. 1, the present invention comprises supplemental fairing 20 and bracket 30. Supplemental fairing 20 mounts directly over base fairing assembly 11 of modern sportbike 10. Bracket 30 provides for a rigid connection between flange 21 of supplemental fairing 20 and a suitable point on modern sportbike 10 at a location below or behind base fairing assembly 11 of modern sportbike 10. Bracket 30 can be configured to rigidly attach to modern sportbike 10 in different suitable locations including one of or all of the following: the outer surface of the steering column of modern sportbike 10, the inner surface of the steering column of modern sportbike 10, and a bracket installed as original equipment on modern sportbike 10 which may support base fairing assembly 11 of modern sportbike 10. Mounting of supplemental fairing 20 requires removal of rearview mirrors 12 of modern sportbike 10. Supplemental fairing 20 features holes 22, which align with the mounting points of rearview mirrors 12 on base fairing assembly 11, to allow use of fasteners to reattach rearview mirrors 12 of modern sportbike 10 and secure supplemental fairing 20 to modern sportbike 10. Supplemental fairing 20 also features holes 99, which, when supplemental fairing 20 is emplaced over base fairing assembly 11, correspond to the location(s) of factory-installed fasteners 98 for lower cowl 80 and base fairing assembly 11, to provide for additional means for mounting supplemental fairing 20.

Figure 2:
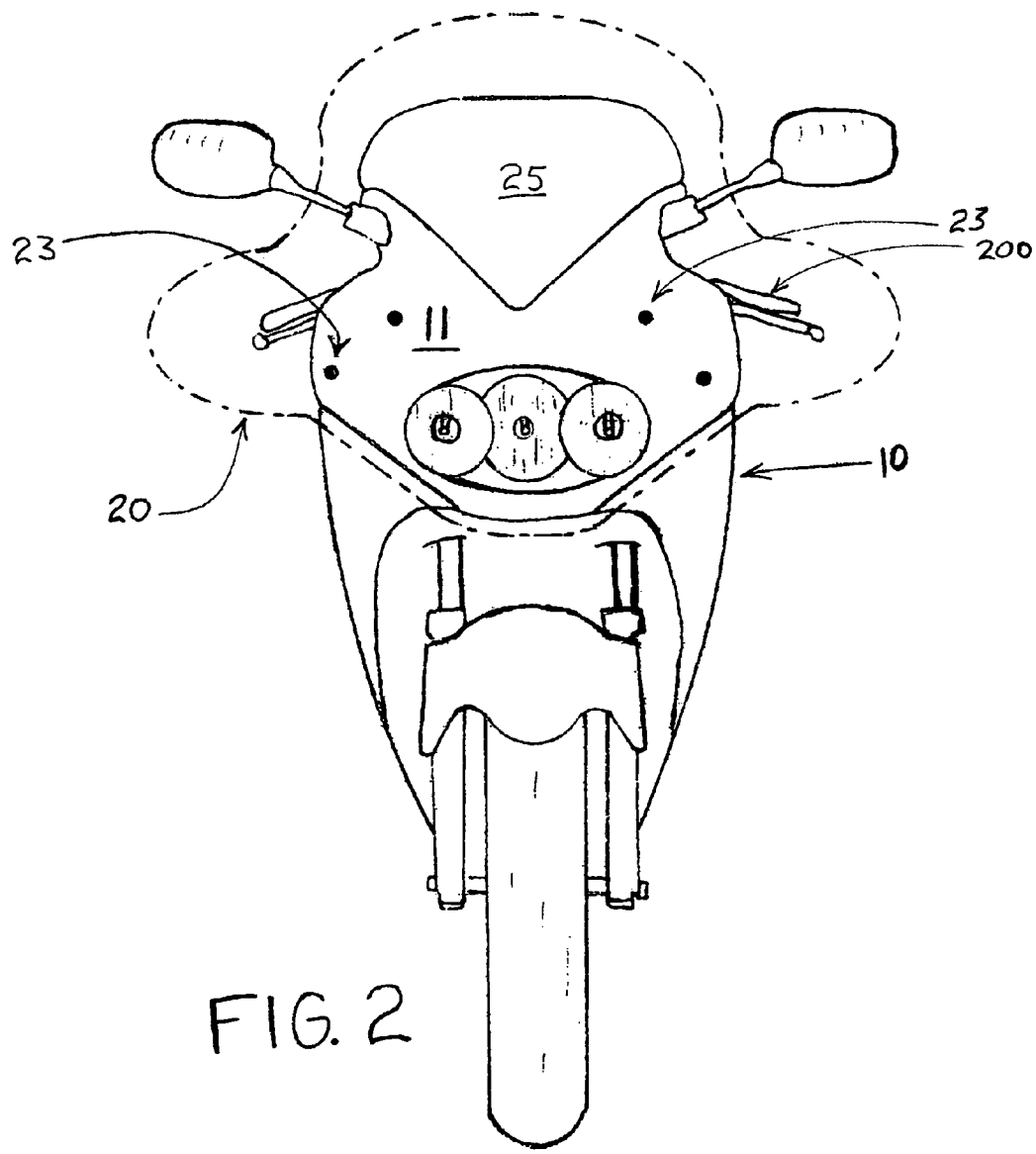
FIG. 2 is a front view of the present invention, fabricated of a transparent material, installed on a modern sportbike, showing the extent of wind protection that the present invention offers while entirely covering the motorcycle's base fairing assembly.

Referring to FIG 2, supplemental fairing 20, made of a transparent material, is mounted on modern sportbike 10. Supplemental fairing 20 extends vertically beyond the top of windscreen 25 of fairing assembly 11 and horizontally beyond handlebar(s) 200 of modern sportbike 10. The present invention includes elastic, self-stick buttons 23 affixed at various locations on inner surface of supplemental fairing 20 to prevent contact between inner surface of supplemental fairing 20 and outer surface of fairing assembly 11 of modern sportbike 10. (The elastic, self-stick buttons 23 are similar to those commonly used on inner surfaces of residential kitchen and bath cabinet doors that serve as "bumpers.") While the elastic, self-stick buttons 23 maintain a "gap" or "space" between the supplemental fairing 20 and the fairing assembly 11 of modern sportbike 10 to preclude possible chafing that could result from vibration, the elastic self-stick buttons 23 also provide a means for vibration and shock isolation.

Figure 3:
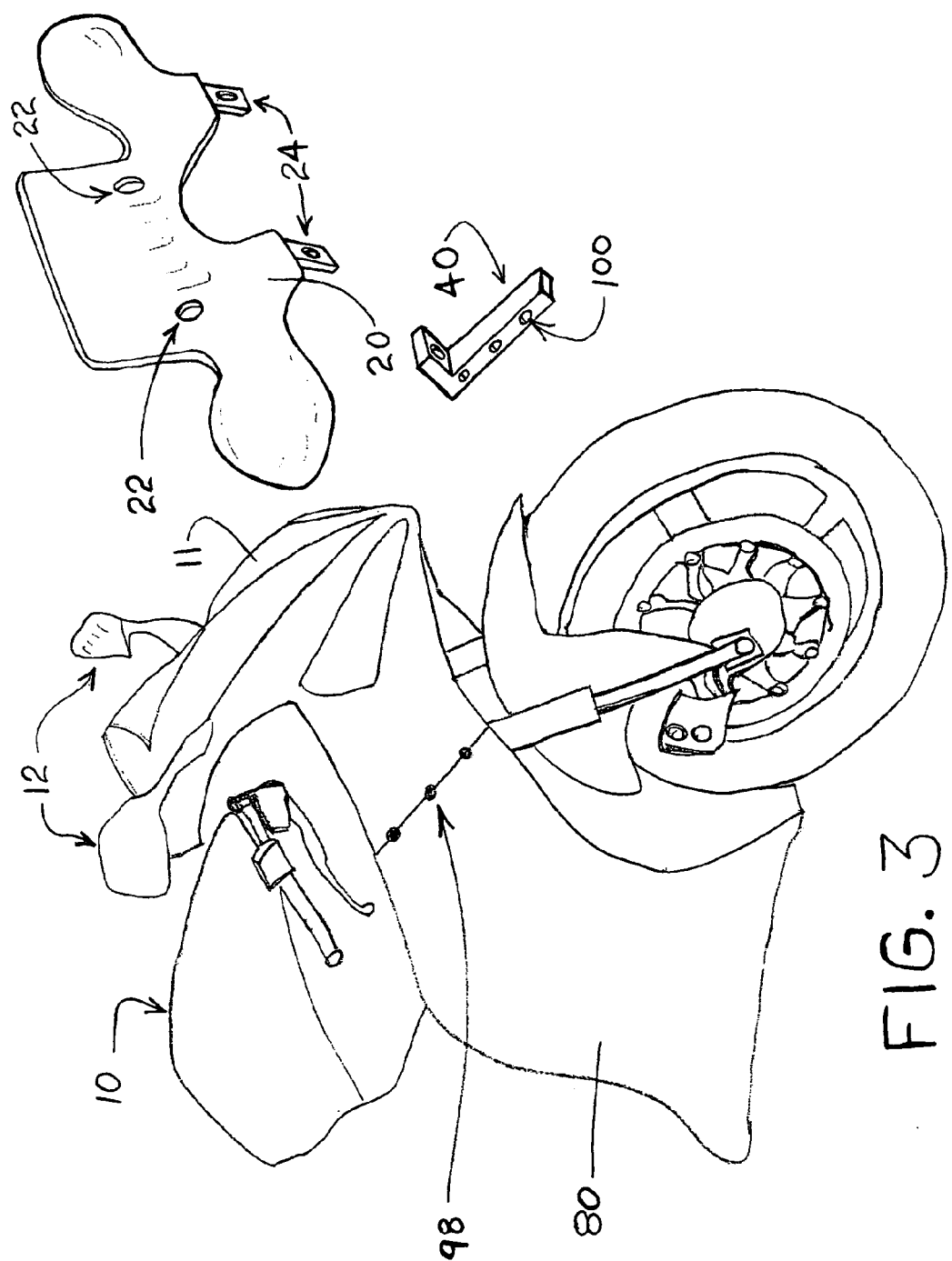
FIG. 3 is an oblique view of a front half of a modern sportbike and the present invention showing how the present invention, configured specifically for the particular sportbike model shown, fits over the motorcycle's base fairing assembly, partially covering the motorcycle's base fairing assembly.

Referring to FIG. 3, the present invention comprises supplemental fairing 20 bracket(s) 40. Supplemental 20 mounts over and partially covers base fairing assembly 11 of modern sportbike 10. Bracket(s) 40 provides for a rigid connection between flange(s) 24 of supplemental 20 and a suitable point on modern sportbike 10 at a location below or on the side of fairing assembly 11 of modern sportbike 10 and/or on the side of lower cowl 80 of modern sportbike 10. Bracket(s) 40, which has holes 100 that align with factory-installed fasteners 98 of lower cowl 80 and base fairing assembly 11, can be connected to modern sportbike 10 using factory-installed fasteners 98 of lower cowl 80 and upper fairing assembly 11 or by using other fasteners in place of factory-installed fasteners 98. Mounting of supplemental fairing 20 requires removal of rear-view mirrors 12 of modern sportbike 10. Supplemental fairing 20 features holes 22, which align with the mounting points of rearview mirrors 12 on base fairing assembly 11, to allow use of fasteners to reattach rearview mirrors 12 of modern sportbike 10 and secure supplemental fairing 20 to modern sportbike 10.

Figure 4:
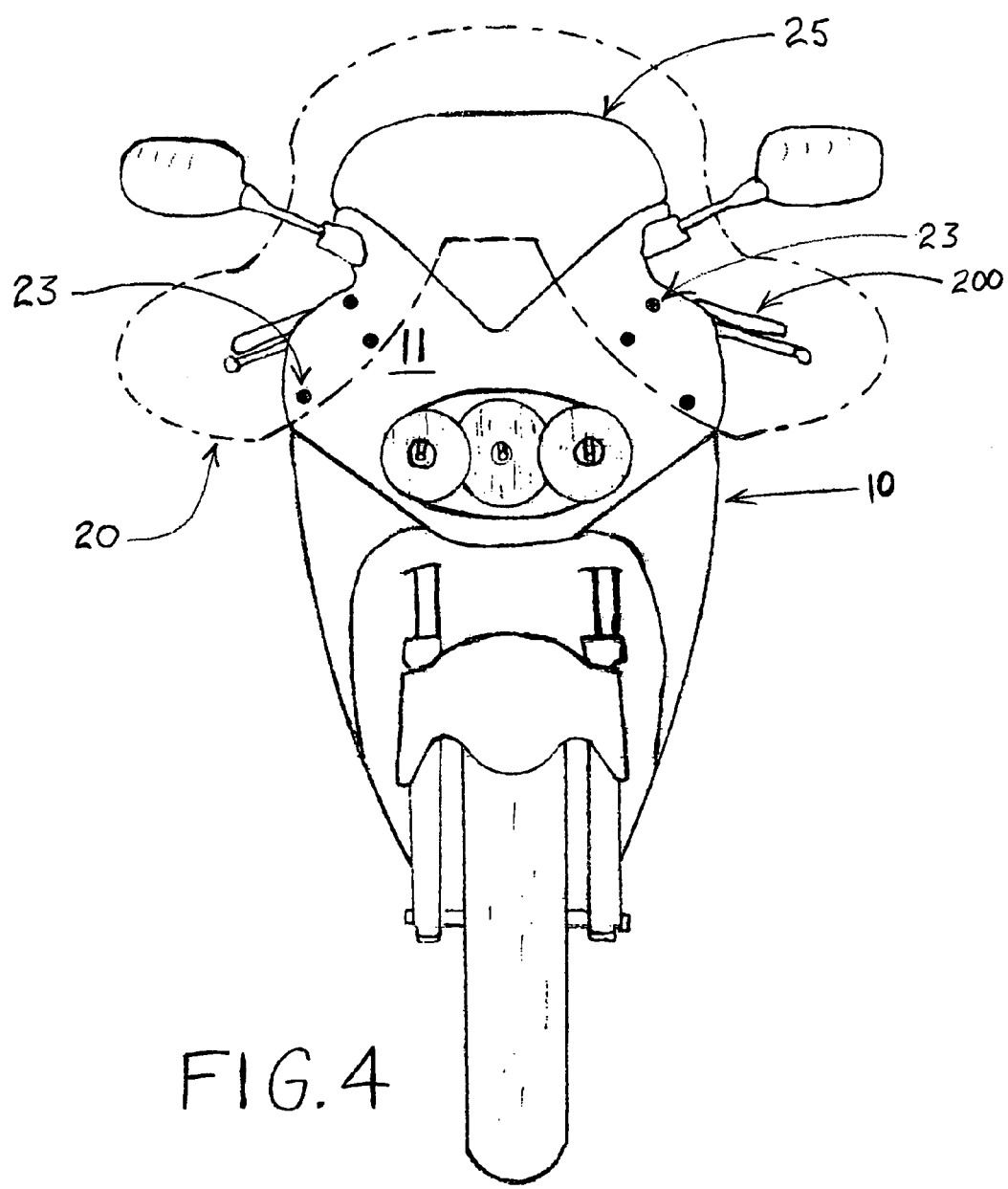
FIG. 4 is a front view of the present invention, fabricated of a transparent material, installed on a modern sportbike, showing the extent of wind protection that the present invention offers while partially covering the motorcycle's base fairing assembly.

Referring to FIG. 4, supplemental fairing 20, made of a transparent material, is mounted on and partially covers base fairing assembly 11 of modern sportbike 10. Supplemental fairing 20 extends vertically beyond the top of windscreen 25 of base fairing assembly 11 and horizontally beyond handlebar(s) 200 of modern sportbike 10. The present invention includes elastic, self-stick rubber buttons 23 mounted at various locations between inner surface of supplemental fairing 20 and outer surface of base fairing assembly 11 of modern sportbike 10 to prevent contact between inner surface of supplemental fairing 20 and outer surface of base fairing assembly 11 of modern sportbike 10. (The elastic, self-stick rubber buttons 23 are similar to those commonly used on inner surfaces of residential kitchen and bath cabinet doors that serve as "bumpers.") The elastic, self-stick rubber buttons 23 maintain a "gap" or "space" between the supplemental fairing 20 and the base fairing assembly 11 of modern sportbike 10 to preclude possible chafing that could result from vibration.

Figure 5:
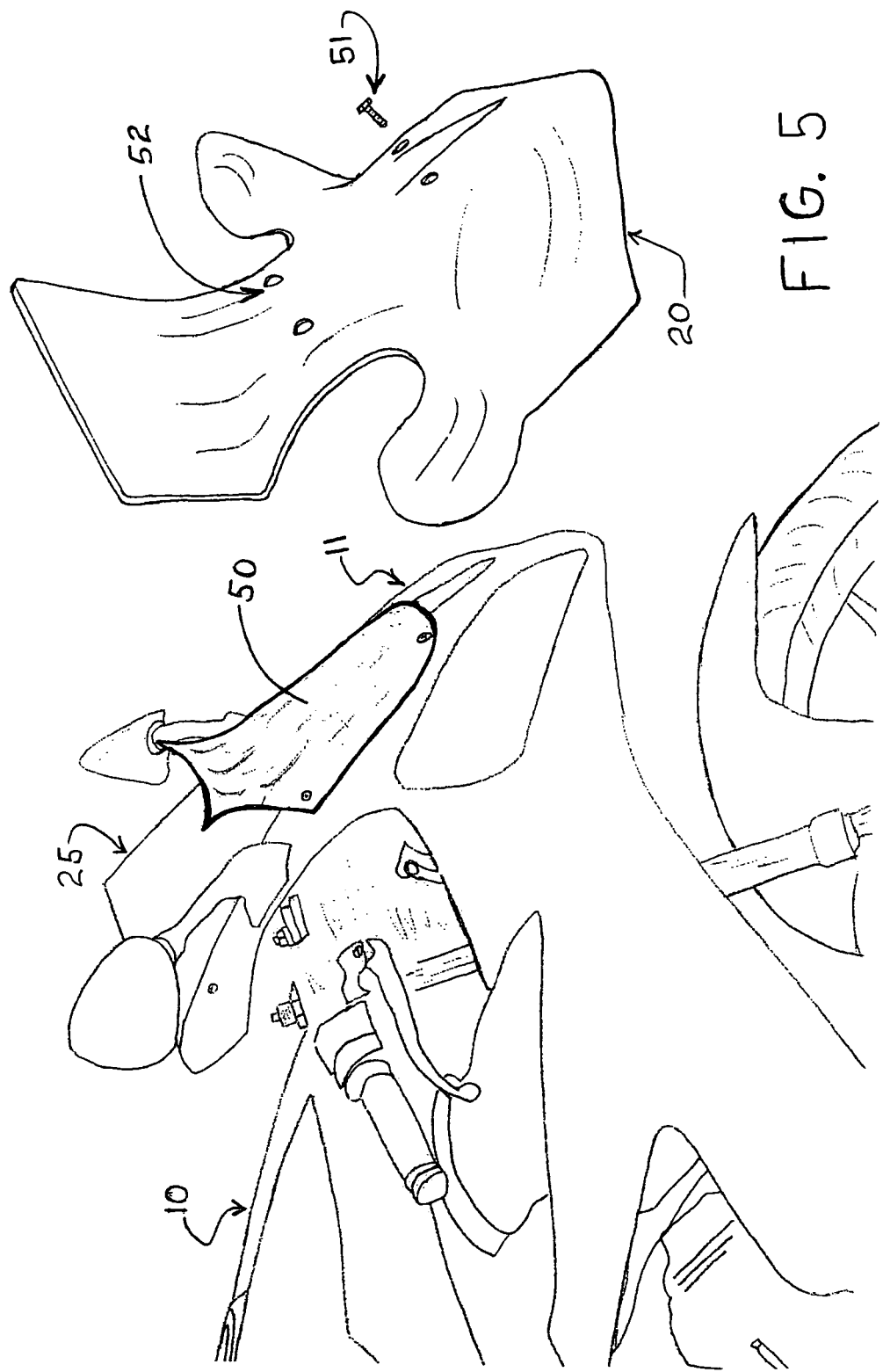
FIG. 5 is an oblique view of a base fairing assembly of a modern sportbike and the present invention showing how the present invention, configured specifically for the particular sportbike shown, fits over the motorcycle's base fairing assembly using an "integrating" bracket mounted between the motorcycle's base fairing assembly and the present invention.

Referring to FIG. 5, the present invention comprises supplemental fairing 20 and bracket 50. Supplemental fairing 20 mounts over base fairing assembly 11 of modern sportbike 10 and bracket 50. Bracket 50, which is wedge-shaped and allows supplemental fairing 20 to fit and mount as an integral part of base fairing assembly 11, provides for a rigid connection between supplemental fairing 20 and modern sportbike 10 without requiring the removal (and reinstallation) of the mirrors of sportbike 10. The fastener hole pattern of bracket 50 and location of holes 52 of supplemental fairing 20 match the fastener pattern of windscreen 25 of base fairing assembly 11 so that bracket 50 can be "sandwiched" between base fairing assembly 11 and supplemental fairing 20 using fastener(s) 51 in locations of factory-installed fasteners for windscreen 25. It should be obvious to those with ordinary skill in the art that supplemental fairing 20 could be designed and fabricated with holes 52 spatially arranged to match female-threaded holes or studs emplaced in bracket 50 at locations not corresponding to fastener locations of windscreen 25 to allow mounting (and removal) of supplemental fairing 20 without removing fasteners used to secure bracket 50. It should be further obvious to those with ordinary skill in the art that supplemental fairing 20 could be designed and fabricated with bracket 50 as an integral feature and that fastener locations on base fairing assembly 11 other than those for windscreen 25 could be used to secure supplemental fairing 20.

I claim:

1. A supplemental fairing for a sportbike motorcycle that has a frame, steering system including handlebars pivotally mounted at a forward portion of said frame, the sportbike motorcycle having a base fairing that is fixedly mounted at the forward portion of said frame in a manner which permits the steering system, including the handlebars, to pivot relative to the base fairing and relative to the frame, the base fairing including a headlamp-receiving portion, a nominal windscreen, and at least one rearview mirror-receiving portion, the supplemental fairing comprising:
   a main portion that conforms to the shape of at least a portion of the base fairing of the sportbike motorcycle, whereby the supplemental fairing can be mounted to the sportbike motorcycle in overlying relation to the base fairing;
   an upper body-protecting portion that provides improved wind protection, relative to that which is provided by the base fairing and the nominal windscreen, to the base body of a rider; and
   at least one hand-protecting portion that provides wind protection to at least one hand of a rider.

2. The supplemental fairing of claim 1 further comprising means for mounting the supplemental fairing to the sportbike motorcycle in a manner that utilizes at least one fastener location by means of which the base fairing is mounted.

3. The supplemental fairing of claim 1 further comprising means for mounting the supplemental fairing to the base fairing in a manner that utilizes at least one fastener location by means of which the nominal windscreen is mounted.

4. The supplemental fairing of claim 1 further comprising means for mounting the supplemental fairing to the sportbike motorcycle in a manner that utilizes at least one fastener location by means of which a rearview mirror is mounted to the rearview mirror-receiving portion of the base fairing.

5. The supplemental fairing of claim 4 further comprising means for simultaneously mounting the supplemental fairing and a rearview mirror to the base fairing.

6. The supplemental fairing of claim 1 further comprising a bracket for mounting the supplemental fairing to the sportbike motorcycle at a location other than the handlebars of the sportbike motorcycle.

7. The supplemental fairing of claim 6 wherein said bracket includes at least one means for accommodating at least one fastener, said means for accommodating spatially arranged to match the location of at least one fastener installed by the manufacturer of the sportbike motorcycle.

8. The supplemental fairing of claim 1 further comprising a flange, said flange forms part of a means for mounting said supplemental fairing.

9. The supplemental fairing of claim 1 having a surface area sufficiently large to cover the entirety of said base fairing.

10. The supplemental fairing of claim 1 having a surface area not sufficiently large to cover the entirety of said base fairing.

11. The supplemental fairing of claim 1 further including a means for precluding contact between the inner surface of said supplemental fairing and outer surface of said base fairing.

12. The supplemental fairing of claim 1 further including a means for isolating vibration.

13. A method of mounting a supplemental fairing for a sportbike motorcycle that has a frame, steering system including handlebars pivotally mounted at a forward portion of said frame, the sportbike motorcycle having a base fairing that is fixedly mounted at the forward portion of said frame in a manner which permits the steering system, including the handlebars, to pivot relative to the base fairing and relative to the frame, the base
fairing including a headlamp-receiving portion, a nominal windscreen, and at least one rearview mirror-receiving portion, the method comprising:
the step of overlaying the sportbike base fairing with a supplemental fairing which conforms to the shape of at least a portion of a sportbike base fairing and provides a larger frontal area than the base fairing to improve wind protection for a rider.

14. The method of claim 13 further comprising:
the step of emplacing an elastic object between the sportbike base fairing and the supplemental fairing to isolate vibration.

15. The method of claim 13 further comprising:
the step of emplacing an object between the sportbike base fairing and the supplemental fairing to prevent contact between the outer surfaces of said sportbike base fairing and the inner surfaces of the supplemental fairing.

16. The method of claim 13 further comprising:
the step of fastening the supplemental fairing to the sportbike base fairing using fasteners in locations corresponding to the locations of fasteners installed by the manufacturer of the sportbike.

17. The method of claim 13 further comprising:
the step of overlaying the sportbike base fairing with the supplemental fairing which conforms to the shape of at least a portion of said sportbike base fairing without covering the entirety of said sportbike base fairing.

* * * * *